Dec. 2, 1947. R. C. ZEIDLER 2,431,855
ROTARY FLUID COUPLING SHAFT RETAINING MEANS
Filed Feb. 13, 1946
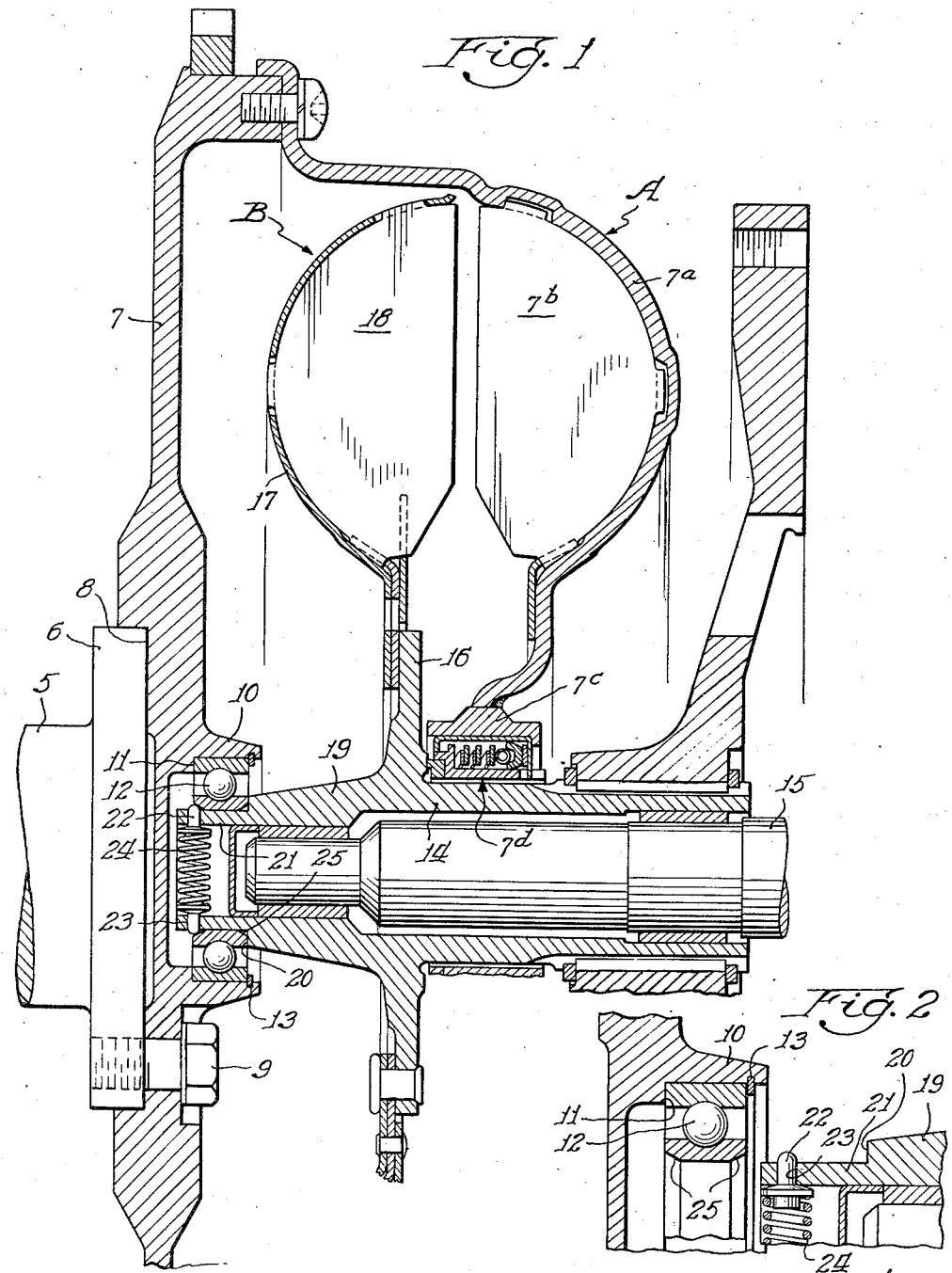
Inventor:
Reinhold C. Zeidler Patented Dec. 2, 1947

2,431,855

UNITED STATES PATENT OFFICE 2,431,855

ROTARY FLUID COUPLING SHAFT RETAINING MEANS

Reinhold C. Zeidler, Detroit, Mich., assignor to Borg-Warner Corporation, Chicago, Ill., a corporation of Illinois Application February 13, 1946, Serial No. 647,247

7 Claims. (Cl. 60—54)

1

The present invention relates generally to fluid couplings and, more specifically, the improvements are directed to means for piloting the shaft or hub portion of the driven assembly of a fluid coupling whereby said shaft or hub portion is restrained against movement in a direction axially of the coupling during operation of the device.

It is one of the principal objects of the invention to simplify the construction of a fluid coupling shaft assembly such as contemplated herein, and to improve the efficiency, operation and dependability of such assembly.

It is also a principal object hereof to provide an assembly such as contemplated which permits the fluid coupling to be readily attached to a standard crank shaft flange without requiring the substitution of a flange of different diameter, thus effecting a considerable saving of expense and permitting interchangeability for servicing.

Another object is to provide a bearing arrangement for interengaged portions of the drive and driven assembly of a fluid coupling in which one assembly is piloted on the other, whereby both assemblies are maintained against longitudinal axial movement, one with respect to the other, during operation of the fluid coupling.

Another object resides in providing a pilot bearing which simplifies and also facilitates the insertion or withdrawal of the driven assembly with respect to the drive assembly, such insertion or withdrawal being effected by a force which is exerted in an axial direction.

A still further object resides in the provision of positive mechanical means for holding the pilot bearing in position in one of the assemblies, and the provision of latching means on the other assembly, which latch means are retractible during the insertion or removal of one assembly with respect to the other.

Further objects, aims and advantages of the present improvements will be apparent to persons skilled in the art after understanding the construction and arrangement of the present improvements.

Fig. 1 is an axial section of a typical fluid coupling showing the present improvements; and Fig. 2 is an enlarged view of a fragmentary portion of the structure shown in Fig. 1, showing the driving and driven assemblies disengaged.

The drawings are to be understood as being more or less of a schematic character for the purpose of disclosing a typical or preferred form of the present improvements.

Referring to Fig. 1, the end of engine crank-

2 shaft 5 has a radial flange 6 to which the fluid coupling is anchored in any suitable manner. The fluid coupling includes a drive assembly A and a driven assembly B that is encompassed by the drive assembly.

The drive assembly A comprises a disc-like plate 7 having a centrally arranged recess 8 for seating the crankshaft flange 6 to which it is secured by bolts 9 screwed through the plate and flange from the inside of the coupling. As seen in the drawings, the plate 7 is continuous throughout its central region and is not provided with the usual axial opening which has heretofore required a closure such as a seal cap. Thus, the problem of leakage at this central region is definitely eliminated. At its central region plate 7 has an axially projecting annular flange 10 which is interiorly shouldered as at 11 to provide a stop for an antifriction bearing unit 12. This bearing, which may be a well-known type, is retained against the shoulder 11 by a snap ring 13 seated in an internal channel adjacent the rim of flange 10. The driven assembly includes the housing 7a bolted or otherwise secured to the disc-like driving plate 7 adjacent the rim thereof. Housing 7a may be of a somewhat semi-toroidal shape in cross section or it may take other forms as required by the service. The driving vanes or blades 7b of the drive assembly A are preferably of semi-circular contour and have their arcuate or segmental edges suitably anchored to the corresponding arcuate portions of housing 7a. The radially inner region of the housing terminates in a hollow annular boss 7c containing suitable sealing means 7d such as a plurality of waved spring washers for pressing a seal ring against an adjacent surface of the driven assembly.

The driven assembly comprises the sleeve 14 which surrounds the driven or take-off shaft 15 and has an annular flange 16 intermediate its ends for supporting the shell 17 carrying the blades or vanes 18 of the driven assembly B. The forward portion of sleeve 14 has a tapered hub portion 19, shouldered as at 20, and beyond this shoulder there is a cylindrical end portion 21 arranged to be inserted into the bearing 12 until said shoulder 20 abuts the side of the bearing that is radially inward from snap ring 13.

For the purpose of retaining the hub and sleeve in proper relation to bearing 12, and for facilitating the insertion and withdrawal of the sleeve hub, a suitable detent arrangement is provided. This arrangement comprises headed plungers 22 the shanks of which are guided in radial holes 23 at the inner end region of hub 19. A suitable spring 24 is compressed between the heads of the plungers to urge them in radially outward directions to project their outer ends beyond the surface of the hub. As seen in detail in Fig. 2, the inner corner portions of the bearing 12 are chamfered as at 25 so that, when the end of hub 19 is inserted into said bearing by a force exerted in a direction axially of the assembly, these detents or plungers 22 will engage the right-hand chamfered region and will be retracted into their guide holes 23 while the hub is being forced into the bearing. When hub shoulder 20 has contacted bearing 12, the protruding ends of the plungers will be engaged with the opposite side of the bearing as seen in Fig. 1. Whenever it is desired to disassemble the hub from the bearing a force may be exerted toward the right (Fig. 1) and the detents will be retracted by the adjacent chamfer of the bearing thus releasing the hub so that it may be withdrawn.

The arrangement disclosed herein provides an effective means for piloting one of the assemblies of a fluid coupling with respect to the other assembly. The arrangement also permits and facilitates the insertion or withdrawal of one of the assemblies with respect to the other. As seen in Fig. 1, the bolts 9 for connecting the coupling to the crankshaft flange are inserted from the inside of the coupling thus effecting the ready installation of the fluid coupling on the crankshaft flange of a motor vehicle or the like without necessitating substitution of the flange.

While the present invention has been disclosed in its typical or preferred form or embodiment it will be apparent to persons skilled in the art, after understanding the improvements, that changes and modifications thereof may be made without departing from the spirit of the invention. It is aimed in the appended claims to cover all such changes and modifications.

I claim:

1. In a fluid coupling, a drive assembly, and a driven assembly, said assemblies having members arranged in telescoped relation for piloting one assembly on the other; bearing means between said telescoped members; shoulders on said members abutting said bearing means; stop means on one member for maintaining said bearing means against the shoulder on said one member; and yieldable means on the other member for maintaining said bearing means against the shoulder on said other member for effecting the aforesaid piloting of one assembly on the other, and also for restraining each assembly against axial movement relative to the other assembly.

2. In a fluid coupling, a drive assembly, and a driven assembly, said assemblies having semi-toroidal cross-section and having members arranged in telescopic relation for piloting one assembly on the other; bearing means between said telescoped members; shoulders on said members abutting said bearing means; a snap ring on one member for maintaining said bearing means against the shoulder on said one member; and spring loaded plunger means arranged radially on the other member for maintaining said bearing means against the shoulder on said other member, whereby to effect the aforesaid piloting of one assembly on the other, and also to restrain each assembly against axial movement relative to the other assembly.

3. In a fluid coupling, a drive assembly, and a driven assembly, said assemblies having semi-toroidal cross-section; a hub portion on said driven assembly; an annular flange portion at the central region of said drive assembly, said flange telescoping said hub for piloting the driven assembly on the drive assembly; bearing means between said telescoped portions of said assemblies; shoulders on said hub and flange abutting said bearing means; snap ring means on said flange for maintaining said bearing means against the shoulder on said flange; and spring loaded plunger means arranged diametrically of said hub for maintaining said bearing means against the hub shoulder, whereby to effect the aforesaid piloting of said driven assembly, and also to restrain said hub against axial movement relative to said flange, the construction and arrangement of said plunger means and bearing means being such that said hub is adapted to be inserted into and to be withdrawn from said bearing by force exerted in a direction axially of the coupling.

4. In a fluid coupling, a driving assembly comprising a disc-like plate adapted to be secured to a drive shaft flange; a hollow cylindrical boss projecting axially from the central region of said plate; a shoulder within said boss inwardly of the rim thereof; a driven assembly arranged within said driving assembly and comprising a sleeve; an axially projecting hub at an end portion of said sleeve; said hub being entered in said boss and having a shoulder opposed to but spaced from the shoulder in said boss; and means for piloting said hub in said boss comprising a bearing engaged with the boss shoulder and maintained thereagainst by stop means on said boss; and retractable stop means carried by the end region of said hub and being engaged with said bearing radially opposite the shoulder of said boss; whereby said assemblies are maintained against accidental axial movement relative to each other under normal load conditions of the fluid coupling, the construction and arrangement of said piloting means being effective to permit said hub to be inserted into and to be withdrawn from said bearing by an axial force sufficient to retract said retractable stop means.

5. In a fluid coupling, a driving assembly of semi-toroidal cross-section comprising a disc-like plate adapted to be secured to a drive shaft flange; a hollow cylindrical boss projecting axially from the central region of said plate; a shoulder within said boss inwardly of the rim thereof; a driven assembly of semi-toroidal cross-section arranged within said driving assembly and comprising a radially flanged sleeve; an axially projecting hub at an end portion of said sleeve; said hub being entered in said boss and having a shoulder opposed to but spaced from the shoulder in said boss; and means for piloting said hub in said boss comprising a bearing engaged with the boss shoulder and maintained thereagainst by snap ring means seated on said boss; and retractable spring loaded plunger means carried by the end region of said hub and being engaged with said bearing radially opposite the shoulder of said boss; whereby said assemblies are maintained against accidental axial movement relative to each other under normal operating conditions of the fluid coupling, the construction and arrangement of said piloting means being effective to permit said hub to be inserted into and to be withdrawn from said bearing by an axial force sufficient to retract said spring loaded plunger means.

6. In a fluid coupling arrangement, a driving assembly, and a driven assembly encompassed thereby; said driving assembly comprising a plate adapted to be secured to the flange of a drive shaft, said plate being closed at the region of its axis; a shouldered annular flange projecting axially toward said driven assembly at the central region of said plate; bearing means seated in said flange in abutting relation to the shouldered portion thereof; removable stop means internally in said flange, said stop means and shoulder being adapted to maintain said bearing means against axial movement; said driven assembly comprising a sleeve having a hub portion telescoped in the shouldered flange of said driving plate, said hub being removably received in said bearing means for piloting said driven assembly; a shoulder on said hub engaging said bearing at the side thereof which is opposite the shoulder on said driving plate flange; retractable stop means arranged diametrically opposite each other at the entered end portion of said hub, said retractable stop means being engaged with the side of said bearing means which is radially inward from the shoulder on said driven plate flange; said first and second stop means and shoulders together being arranged to retain said driven assembly in piloted relation to said driving assembly and being adapted to facilitate assembly and removal of said driven assembly by force exerted axially of the one with respect to the other.

7. In a fluid coupling arrangement, a driving assembly, and a driven assembly encompassed thereby, said assemblies each having approximately semi-toroidal cross-section; said driving assembly comprising a disc-like plate adapted to be secured to the flange of a drive shaft; a shouldered annular flange projecting axially toward said driven assembly at the central region of said plate; bearing means seated in said flange in abutting relation to the shouldered portion thereof; a snap ring seated internally in said flange, said snap ring and shoulder being adapted to maintain said bearing means against axial movement; said driven assembly comprising a sleeve having a hub portion telescoped in the shouldered flange of said driving plate, said hub being removably received in said bearing means for piloting said driven assembly; a shoulder on said hub engaging said bearing at the side thereof which is opposite the shoulder on said driving plate flange; spring loaded retractable plunger means arranged diametrically opposite each other at the entered end portion of said hub, said plunger means being engaged with the side of said bearing means which is radially inward from the shoulder on said driven plate flange; said snap ring, said plunger means, and said shoulders together being arranged to retain said driven assembly in piloted relation to said driving assembly and being adapted to facilitate assembly and removal of driven assembly by force exerted axially of the one with respect to the other.

REINHOLD C. ZEIDLER.

REFERENCES CITED

The following references are of record in the file of this patent:

UNITED STATES PATENTS

| Number | Name | Date |
|---|---|---|
| 2,009,371 | Junge | July 23, 1935 |
| 2,011,735 | Sinclair | Aug. 20, 1935 |
| 2,073,957 | Brouwer | Mar. 16, 1937 |
| 2,334,282 | Peterson et al. | Nov. 16, 1943 |